United States Patent [19]

Jaulmes

[11] 4,252,095
[45] Feb. 24, 1981

[54] IGNITION SYSTEM FOR AN INTERNAL COMBUSTION ENGINE

[75] Inventor: Christian Jaulmes, Paris, France

[73] Assignee: Ateliers de la Motobecane, Pantin, France

[21] Appl. No.: 116,765

[22] Filed: Jan. 30, 1980

[30] Foreign Application Priority Data

Jan. 31, 1979 [FR] France .................. 79 02474

[51] Int. Cl.³ .................................................. F02B 0/00
[52] U.S. Cl. ................................... 123/329; 123/335; 123/355; 123/418
[58] Field of Search ................ 123/329, 335, 355, 418

[56] References Cited

U.S. PATENT DOCUMENTS

| | | | |
|---|---|---|---|
| 3,153,746 | 10/1964 | Atkinson | 123/335 |
| 3,738,340 | 6/1973 | Olson | 123/335 |
| 3,884,203 | 5/1975 | Cliffgard | 123/335 |
| 3,985,109 | 10/1976 | Kondo | 123/118 |
| 4,163,431 | 8/1979 | Wilkinson | 123/335 |
| 4,198,933 | 4/1980 | Sieber | 123/335 |

*Primary Examiner*—Ronald B. Cox
*Attorney, Agent, or Firm*—Browdy and Neimark

[57] ABSTRACT

An ignition system for an internal combustion engine, which includes circuitry for producing pulses at a frequency directly related to rotational speed of the engine and a capacitor discharge circuit. A first monostable circuit responsive to the pulses is arranged for triggering the capacitor discharge circuit by passing from its stable state to its unstable state. A second monostable circuit responsive to the pulses is arranged for triggering the capacitor discharge circuit when passing from its unstable state to its stable state. The time constant of the first monostable circuit is substantially equal to the frequency of the ignition system discharge corresponding to the maximum admissible speed of the engine. The time constant of the second monostable circuit being equal to a predetermined value equal to a value of retarded ignition allowing operation of the engine at a reduced power.

7 Claims, 2 Drawing Figures

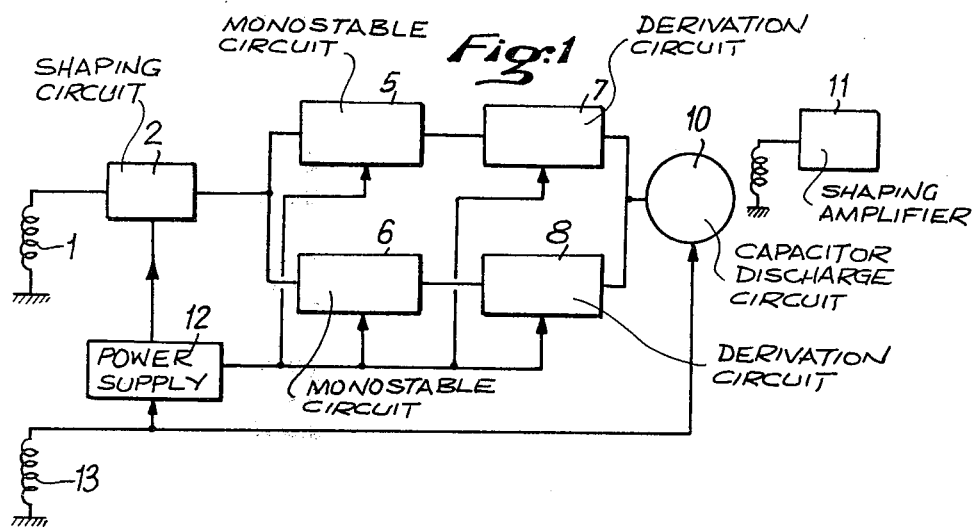
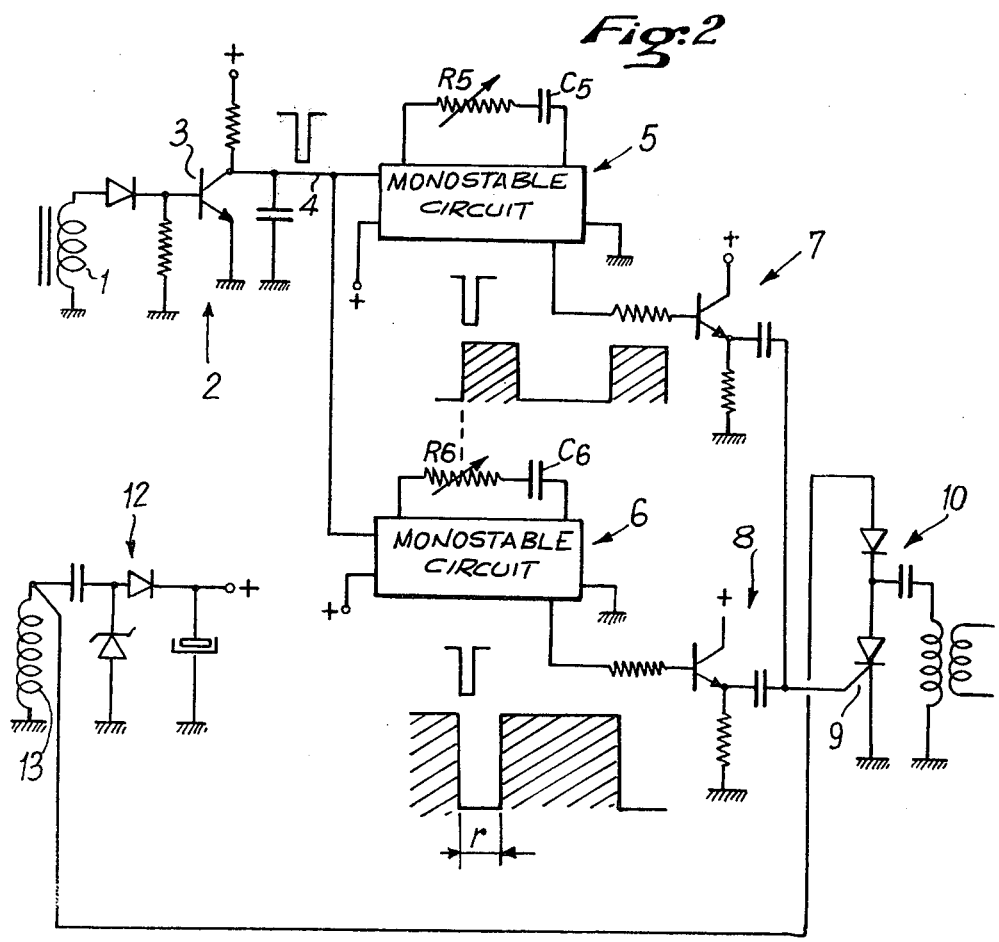

IGNITION SYSTEM FOR AN INTERNAL COMBUSTION ENGINE

BACKGROUND OF THE INVENTION

This invention relates to an ignition system for an internal combustion engine, and more particularly to such a system having an electronic control circuit for advancing the ignition.

It is known that there exists in various countries regulations imposing a maximum speed for some transport vehicles and, in particular, for motorcycles. Consequently, various devices have already been proposed, allowing limiting the power of the engine of vehicles whenever they reach the maximum allowed speed. There exists for example mechanical regulators which achieve the limiting function. Unfortunately, this type of device can easily put out of order, so that they are often ineffectural.

SUMMARY OF THE INVENTION

The present invention aims at providing a system of the above-mentioned type, wherein, on the one hand, the cutting-off speed is fixed with great accuracy, and which on the other hand cannot be put out of order. More particularly, the invention allows, in an ignition system having a condenser and a capacitor discharge circuit, modifying the advanced ignition from a predetermined speed, so that the speed is no longer optimum and the performance of the engine is reduced.

To this effect, the ignition system according to the present invention includes a first monstable circuit arranged for triggering a capacitor discharge circuit by passing from its stable state to its unstable state and a second monostable circuit adapted for triggering the capacitor discharge circuit when passing from its unstable state to its stable state, the time constant of the first monostable circuit being substantially equal to the frequency of the ignition circuit discharge corresponding to the maximum admissible speed of the engine, and the time constant of the second monostable circuit being equal to a predetermined value.

Thus, when the speed of the vehicle is lower than the maximum admissible speed, the ignition is controlled by the first monstable circuit passing from its stable state to its unstable state. When the period of the passage tends to become lower than the time constant of the first monostable circuit, the circuit remains in its unstable state so that it is without effect on the capacitor discharge circuit. At this moment, the latter is then triggered by the passage from the unstable state to the stable state of the second monostable circuit, but with a delay equal to the time constant of the second monostable circuit. Thus, the advanced ignition is reduced by a duration equal to the time constant of the second monostable circuit, thereby resulting in reducing the engine power.

One finds consequently that the maximum admissible speed can be controlled with great accuracy because the advanced ignition may take one value or another value at each discharge of the ignition circuit.

In a preferred embodiment, the ignition system according to the invention includes a shaping circuit adapted for supplying from the signal delivered by control voltage pulses of frequency proportional to the engine speed, and circuitory for feedng these pulses to the respective inputs of the two monostable circuits, the time constant of the second monostable circuit being equal to a value of the ignition delay allowing the operation of the engine at a reduced power.

Preferably, the output of each monstable circuit is applied to the capacitor discharge circuit through a respective buffer or derivation circuit.

Advantageously, the ignition system according to the invention includes connection allowing it to be supplied power from an ignition coil of the engine. Thus, it is unnecessary to provide a separate voltage source such as a second battery.

Preferably also, the system is made as a single tamper-proof block so that, in particular, the first monostable circuit cannot be replaced by another circuit having a lower time constant, which would have the effect of increasing the maximum speed.

BRIEF DESCRIPTION OF THE DRAWINGS

The details of the invention are to become more apparent from the following description of one embodiment thereof when taken in conjunction with the accompanying drawings wherein:

FIG. 1 is a schematic circuit diagram showing the various operational units of an ignition system according to the present invention; and FIG. 2 is a more detailed schematic representation of the circuit of FIG. 1.

DESCRIPTION OF THE PREFERRED EMBODIMENT

The system according to the illustrated embodiment includes sensor 1, shown as a magnetic pick-up coil arranged for supplying voltage pulses having a frequency proportional to the rotational speed of the engine. The pulses from the sensor are shaped by a shaping circuit 2 which, as is shown in FIG. 2, comprises a transistor 3 operatively arranged to be either blocked or saturated. Consequently, at the output of the transistor 3, pulses of same frequency as those delivered by the sensor are provided but whose rising front is far steeper in order to provide a convenient triggering of monostable circuits which are to be described hereinbelow. In the example shown in FIG. 2, the pulses are negative.

The output pulses from the transistor 3 are directed, via a conductor 4, to the respective inputs of two monostable circuits 5 and 6. The monostable circuit 5 is determined by its time constant $R_5C_5$ and the monostable circuit 6 is determined by its time constant $R_6C_6$. One sees in FIG. 2 that the monostable circuit 5 passes from its stable to its unstable state upon the occurrance of a descending pulse front.

The outputs of the monostable circuits 5 and 6 are applied respectively to respective buffer or derivation circuits 7 and 8, of known type.

Finally, the outputs of the derivation circuits 7 and 8 are applied to the gate of a thyristor 9 of a capacitor discharge circuit 10, known per se. The output of the last mentioned circuit is applied to a shaping amplifier 11 supplying the necessary high voltage to the ignition.

Finally, it is to be noted that the low voltage necessary to operate the system is supplied by a power circuit 12 connected to an ignition coil 13 of the engine. The circuit thus needs no special power sources such as an auxiliary battery or the like.

In the example shown, the thyristor 9 is switched by a positive voltage pulse, that is by an ascending front of a signal from one of the monostable circuits 5 and 6. As long as the voltage pulses delivered by the shaping circuit 2 at the input of the monostable circuit 5 have a frequency lower than the time constant $R_5C_5$ of the monostable circuit 5, the signal at the output of the latter assumes the shape of a square wave, each ascending front of which provides, after derivation, the actuation of thyristor 9. This actuation operation is therefore synchronized with the voltage pulses applied by the sensor 1 via the shaping circuit 2. When the frequency of the signals delivered by the circuit becomes higher than the time constant $R_5C_5$ of the monostable circuit 5, the latter reamins in its unstable state so that the derivation circuit 7 coupled to its output does not supply any more a signal to the thyristor 9. On the contrary, the monostable circuit 6, whose time constant $R_6C_6$ is far lower than that of monostable circuit 5, continues to assume the shape of a square wave. Consequently, the derivation circuit 9 continues supplying the thyristor 9 with positive voltage pulses, but with a delay r equal to the time constant $R_6C_6$ of the monostable circuit 6. One establishes therefore that as long as the frequency of the signals delivered by the sensor 1 is lower than a limit value equal to $R_5C_5$, the ignition is synchronized with the signal and is optimum. On the other hand, when said frequency becomes higher than the value $R_5C_5$, the ignition has a delay r with respect to the signals delivered by the sensor 1, which reduces the performance of the engine, so that the engine cannot exceed the speed corresponding to the critical frequency.

Moreover, it is advantageous to provide that the circuits 2, 5, 8, 10 and 12 are made as a single tamper-proof block so that it is not possible to put this ignition regulation system out of order.

It goes without saying that the present invention is not limited to the embodiment described hereabove, but includes all possible alternative embodiments and variants.

What is claimed is:

1. In an ignition system for an internal combustion engine, which includes means for producing pulses at a frequency directly related to rotational speed of the engine and capacitor discharge circuit, the improvement comprising a first monostable circuit responsive to said means for producing pulses and arranged for triggering and capacitor discharge circuit by passing from its stable state to its unstable state, and a second monostable circuit responsive to said means for producing pulses and arranged for triggering said capacitor discharge circuit when passing from its unstable state to its stable state, the time constant of said first monostable circuit being substantially equal to the frequency of the ignition system discharge corresponding to the maximum admissible speed of the engine, and the time constant of said second monostable circuit being equal to a predetermined value.

2. An improved ignition system according to claim 1, including a shaping circuit coupled between said means for producing pulses and said first and second monostable circuits for supplying from signals delivered thereto voltage pulses of frequency proportional to engine speed and means for directing these voltage pulses to inputs of said two monostable circuits, said time constant of said second monostable circuit being equal to a value of retarded ignition allowing operation of the engine at a reduced power.

3. An improved ignition system according to either claim 1 or claim 2, wherein an output from each said monostable circuit is applied to said capacitor discharge circuit.

4. An improved ignition system according to claim 3, including power supply means for supplying power to active circuit components, said power supply means including an ignition coil of the engine.

5. An improved ignition system according to claim 4, wherein at least said first and said second monostable circuits are constructed as a single tamper-proof block.

6. An improved ignition system according to claim 1 or claim 2, including power supply means for supplying power to active circuit components, said power supply means including an ignition coil of the engine.

7. An improved ignition circuit according to claim 1 or claim 2, wherein at least first and said second monostable circuits are constructed as a single tamper-proof block.

* * * * *